United States Patent Office 3,352,808
Patented Nov. 14, 1967

3,352,808
GRAFT COPOLYMERS OF STYRENE AND BUTADIENE ONTO POLYVINYL LACTAM HOMOPOLYMERS
Marvin R. Leibowitz, Edison, and Frederick Grosser, Midland Park, N.J., assignors to General Aniline & Film Corporation, New York, N.Y., a corporation of Delaware
No Drawing. Filed Sept. 9, 1963, Ser. No. 307,366
8 Claims. (Cl. 260—29.7)

This invention relates to novel and interpolymers of N-vinyl lactams with styrene and butadiene and a process for their production and more particularly to a stable aqueous emulsion containing such interpolymers and to the process for producing such emulsions.

It is well known that many N-vinyl lactams can be interpolymerized with other polymer monomers. However, it has not been possible to produce interpolymers of N-vinyl lactams with styrene and butadiene. Techniques which have been used to form copolymers of styrene or butadiene or interpolymers of these with other monomers do not work with N-vinyl lactams.

Attempts to prepare an N-vinyl lactam-styrene-butadiene interpolymer by ordinary techniques led to the formation of a polymer containing very little of the N-vinyl lactam. Apparently the N-vinyl lactam will not enter the polymer chain to any extent, using ordinary copolymerization techniques.

It has now been found that N-vinyl lactam-styrene-butadiene interpolymers can be formed by using a new and novel technique, which surprisingly gives extremely stable emulsions, if so desired.

The novel interpolymers of this invention can be compounded with a wide variety of additives such as pigments, clays, salts, protective colloids, wetting agents, plasticizers, resins, waxes, etc. in order to obtain a wide range of products for use in all fields in which emulsion polymers are now used.

It is an object of this invention to provide a method for producing a stable aqueous emulsion containing a polymeric N-vinyl lactam. Another object of this invention is the provision of novel graft copolymers containing a polymeric N-vinyl lactam. Other objects and advantages will appear as the description proceeds.

The attainment of the above objects is made possible by the process of this invention which, in brief, comprises subjecting a mixture of styrene and butadiene monomers in an aqueous solution of a polymeric N-vinyl lactam to polymerization conditions in the presence of a free radical-supplying polymerization catalyst. The process of this invention enables the production of aqueous emulsions having surprisingly improved properties with respect to stability, low viscosity, film clarity, and the like. Extraction, solubility and film clarity tests indicate that in these emulsions, the polymeric product is in a high degree of interpolymerization or copolymerization and contains a minimum amount of homopolymer. The resulting emulsions can be compounded with a wide variety of additives such as pigments, salts, protective colloids, wetting agents, plasticizers, resins, waxes and the like to obtain a wide range of products for use in all fields in which polymeric emulsions are now used as in the paint, coatings, adhesives, polishes, textile and rubber fields. They have particularly good properties for use as tire cord adhesive in laminating tire cord to rubber. In particular, the lamination of nylon tire cord to rubber is a difficult lamination and the novel interpolymer of this invention has outstanding properties as an adhesive base for this lamination.

N-vinyl lactams and water soluble polymers thereof, and methods for their production are well known in the art. Thus, for example, U.S. Patent 2,317,804 discloses a suitable method for preparing N-vinyl lactams and U.S. Patents 2,215,450 and 2,335,454 disclose methods for preparing water soluble polymers thereof and aqueous solutions containing the same. As examples of N-vinyl lactams which may be employed in producing in known manner the operative aqueous solutions of water soluble polymers thereof, there may be mentioned the N-vinyl derivatives of gamma-, delta-, and epsilon-lactams (N-vinyl derivatives of the cyclic amides of gamma-, delta-, and epsilon-aminocarboxylic acids of the aliphatic series) and lower alkyl (methyl, ethyl) substituted derivatives of such N-vinyl lactams. Among this group, N-vinyl-2-pyrrolidone (otherwise referred to as I-vinyl-2-pyrrolidone, N-vinyl-$\alpha$-pyrrolidone) is preferred. As illustrative of other N-vinyl lactams within this group there may be mentioned N-vinyl-2-piperidone, N-vinyl-6-caprolactam, N-vinyl-5-methyl-2-pyrrolidone, N-vinyl-3,3-dimethyl-2-pyrrolidone, and the like. Other N-vinyl lactams which may be employed include N-vinyl-hexahydrophthalamidine, N-vinyl-naphthostyrile, etc. Depending upon the extent of polymerization, these polymeric N-vinyl lactams may have molecular weights ranging from at least 400 up to 2,000,000 or more. The Fikentscher K value as described, for example, in Schildknecht, Vinyl and Related Polymers, John Wiley & Sons, Inc., New York, 1952 (page 676), is a convenient designation of relative degree of polymerization or relative molecular weight. Generally, there may be employed those polymeric N-vinyl lactams having a K value of about 10 to 200 and preferably about 20 to 60, and mixtures thereof.

The free radical-supplying redox polymerization catalysts useful in the present process are well known in the art. Most of these catalysts are compounds yielding oxygen under the conditions of polymerization, as represented by the inorganic and organic peroxygen or peroxide compounds. As examples of such compounds, there may be mentioned hydrogen peroxide, metal and alkali metal peroxides such as sodium potassium, barium and zinc peroxide, diacyl peroxides such as diacetyl, dibenzoyl and dilauroyl peroxide, dialkyl peroxides such as di-tertiary-butyl peroxide and cyclohexene peroxide, hydroperoxides such as tertiary-butyl hydroperoxide and p-methane hydroperoxide, peroxygen acids such as perfomic, persulfuric and peracetic acid and their ammonium, sodium and potassium salts, in addition to systems such as potassium or ammonium persulfate-sodium bisulfite. Other oxygen-yielding compounds or sources include atmospheric oxygen, ozone and the like.

Azo type catalysts, i.e., compounds containing the azo linkage, may also be employed. As example of such catalysts there may be mentioned $\alpha,\alpha'$-azobis-($\alpha,\gamma$-dimethylvaleronitrile), $\alpha,\alpha'$-azobis-($\alpha$-methyl butyronitrile), $\alpha,\alpha'$-azobis-($\alpha$-ethyl butyronitrile), $\alpha,\alpha'$-azo-diisobutyramide, dimethyl and diethyl, $\alpha,\alpha'$-azodiisobutyrate, and the like.

The preferred catalysts effective for the production of optimum results with respect to a minimum of homopolymer and maximum emulsion stability and film clarity are the organic and inorganic peroxygen compounds referred to above, which are preferably employed along with an activator. Some typical activators are amines, meta-bisulfites, ascorbic acid, Fe salts and many other activators which are well known to those skilled in the art.

In carrying out the polymerization reaction, the catalyst and the mixture of styrene and butadiene monomers may be admixed with the aqueous solution of polymeric N-vinyl lactam in any order, in increments or otherwise. For better temperature control and production of a product with optimum properties, it is, however, preferred to add the monomer gradually and/or in increments to the aqueous solution of polymeric N-vinyl lactam containing the catalyst and activator. It is preferred to carry out this reaction at a temperature ranging from about 0° C. up to 100° C. and under sufficient pressure to maintain the butadiene liquid. The pH of the medium is substantially non-critical, though a pH of below 8 and preferably between 2 and 7 is preferred. Completion of the reaction is determined by cessation of evolution of heat and/or spot analysis for solids content and the like.

The polymerization reaction is substantially quantitative in that an emulsion is produced containing the polymeric N-vinyl lactam-styrene-butadiene interpolymer in the dispersed phase with little or no polymeric product dissolved in the continuous aqueous phase.

The ratio of vinyl pyrrolidone polymer to styrene-butadiene can be varied from 5:95 to 60:40 by weight, while the ratio of styrene to butadiene can vary from 5:95 to 50:50. The amount of catalyst should be between 0.05% and 5.00% by weight based on total monomer content with a ratio of catalyst to activator of 0.5:1 to 5:1. Some typical catalysts are persulfate salts, peroxides, hydroperoxides and other peroxy compounds. It is also preferable to conduct the polymerization at between 15–50% solids content. The emulsion can be further concentrated, if desired, after the polymerization. Various surface active agents, protective colloids, plasticizers, chain transfer agents, or other additives can be added prior, during or after the reaction is completed in accordance with techniques well known in the prior art.

The emulsions produced in accordance with this invention are characterized by unusually good stability, low to medium viscosities generally below about 2500 cps. (centipoises, Brookfield Viscosimeter), the ability to deposit a clear transparent film on a glass plate, and a copolymer product which is essentially water insoluble and at least about 90% soluble in benzene. This product may be characterized as a graft copolymer of styrene and butadiene on a polymeric N-vinyl lactam substrate.

It will be understood that in carrying out the process of this invention, the known surface active agents, protective colloids, plasticizers, thickeners, and other additives may be added prior to, during or after the polymerization reaction is completed. Anionic, nonionic or cationic emulsifying agents may be employed although anionic agents are preferred. As examples of nonionic agents which may be employed, there may be mentioned the condensation products of a plurality of moles of ethylene oxide with organic compounds containing at least 8 carbon atoms and a reactive hydrogen atom such as the water insoluble carboxylic and sulfonic acids, alcohols, thiols, phenols, hydroxy carboxylic acids, carboxy and sulfonic acid amides, primary and secondary amines, hydroxyalkylamines, as disclosed, for example, in U.S. Patents 1,970,578, 2,205,021, 2,085,706, 2,002,613, 2,266,141, 2,677,700, 2,213,477, 2,593,112, 2,454,434, 2,454,542–545 and 2,174,761. As specific examples of such nonionic agents there may be mentioned the reaction products of 1 mole of nonylphenol with 9 to 100 E.O. (moles ethylene oxide), 1 mole of castor oil with 20 E.O., 1 mole tall oil with 18 E.O., 1 mole of oleyl alcohol with 20 E.O., 1 mole of dodecyl mercaptan with 9 E.O., 1 mole of soybean oil amine with 10 E.O., 1 mole of rosin amine with 32 E.O., 1 mole of cocoanut fatty acid amine with 7 E.O., 1 mole of dinonyl phenol with 15 E.O., 1 mole of oxo tridecyl alcohol with 12 E.O., Pluronic L62 and the like.

Suitable anionic surface active agents include the sulfonic acids, sulfate esters, and phosphate esters (particularly the primary and secondary phosphate esters and mixtures thereof) of the above mentioned nonionic surface active agents as disclosed, for example, in U.S. Patents 3,004,056 and 3,004,057. Other such anionic surface active agents include alkylaryl sulfonic acids such as dodecylbenzene sulfonic acid, alkyl sulfates such as sodium M-methyl taurides of higher ($C_{10}$ to $C_{20}$) fatty acids as disclosed, for example, in U.S. Patents 1,932,180, 3,013,035, 3,013,036, and 3,057,889, isethionates such as sodium N-methyl isethionate esters of higher ($C_{10}$ to $C_{20}$) fatty acids, as disclosed, for example, in U.S. Patents 2,923,724 and 3,004,049.

Protective colloids and/or thickening agents may also be employed if desired such as polyvinyl alcohol, copolymers such as the copolymer of vinyl methyl ether and maleic anhydride, hydroxyethyl cellulose, carboxymethyl cellulose, natural gums and colloidal materials and the like. Viscosities of up to 80,000 cps. or more may thereby be obtained when required.

Example I (For comparison)

[Attempt to prepare interpolymer using technique of prior art]

To a 1 liter stirred autoclave was added:

377 g. distilled water
100 g. 10% Nekal BX–HC (alkylnaphthalene sulfonate)
0.25 ml. 50% KOH
1.0 g. tetraethylene pentamine
38 g. vinyl pyrrolidone (freshly distilled)
38 g. styrene Agitator turned on and mixture cooled to 5° C. and added butadiene to approximately 20 p.s.i.g.
1.0 g. p-menthane hydroperoxide Vented excess pressure, purged with nitrogen and heated to 50° for 6 hours. Material was then cooled and discharged and percent solids=21.7 (approximately 60% conversion). Material was then charged to a flask and stripped of residual monomer and concentrated 40% solids. In order to determine percent VP in polymer a sample of polymer was analyzed for percent of nitrogen and was 0.26=2% VP in polymer, even though initial percent VP charged was 15%. This indicates that only a small amount of VP entered the polymer chain.

Example II

[Technique of present invention]

To a 1 liter stirred autoclave was added 377 g. distilled water
100 g. 10% solution of a mixture of mono- and diphosphoric esters of a nonylphenol surfactant obtained by condensing 1 molar portion of oxide with 10 molar proportions of ethylene oxide and prepared as described in Example 10 of U.S. Patent 3,004,057
0.5 ml. 50% KOH
1.0 g. tetraethylene pentamine
38 g. polyvinylpyrrolidone having a Fikentscher K value of 30 (prepared by $H_2O_2 \cdot NH_4$ OH polymerization of vinylpyrrolidone) 38 g. styrene The agitator was then turned on and the mixture cooled to 5° C. and there was added butadiene to approximately 20 p.s.i.g. and
1.0 g. p-menthane hydroperoxide Vented excess pressures, purged with nitrogen and heated to 50° C. for 6 hours. Material was then cooled and discharged and percent solids=29.9 (approximately 85% conversion). Material was then charged to a flask and stripped of residual monomer and concentrated to 40% solids. Polymer was analyzed for nitrogen and was 1.92=15% vinyl pyrrolidone, or equal to the amount of vinyl pyrrolidone initially charged. The conversion for the same time period was also much higher, 85% vs. 60%. The polymer film was clear, water insoluble and the emulsion was thin and fluid, all indications of a true interpolymer.

Example III

[Butadiene/styrene/PVP ratio of 67.5/22.5/10]

To a 2-gallon stirred autoclave was charged 1275 g. distilled water
450 g. 10% solution of emulsifier used in Example II
4 ml. 50% KOH
5 g. tert. dodecyl mercaptan
7.5 g. tetraethylene pentamine
89 g. polyvinylpyrrolidone, K=30
200 g. styrene The autoclave was purged with nitrogen and cooled to 0° C. 7.5 g. p-menthane hydroperoxide was charged followed over about 25 minutes by 600 g. butadiene. The vessel was gradually warmed over about two hours to 50° C., and held at this temperature for 10 hours. The product was cooled and discharged giving 2543 g. of a smooth off-white latex containing 35.2% solids, equivalent to 94.3% conversion. Its pH was 9.7 and its viscosity 3,000 cps.

*Example IV*

The procedure of Example III was repeated except that 1380 g. of distilled water and 175 g. of polyvinylpyrrolidone were used.

The product was 2808 g. of a smooth off-white latex containing 35.1% solids, equivalent to 95.1% conversion. Its pH was 9.2 and its viscosity 900 cps.

While the polymer of vinyl pyrrolidone used in preparing the novel polymer of this invention is well known, for the sake of completeness, the following description of a preferred method for its preparation is given:

*Example V*

Into an autoclave is charged water, vinyl pyrrolidone, and NH$_4$OH (25%). This is heated to approximately 60° C. and hydrogen peroxide (35%) is then added to initiate polymerization. After 2-4 hours, the solution is cooled to approximately 5° C. and styrene, emulsifying agent, caustic, redox catalyst and butadiene, is added, material heated to approximately 60° C. for approximately 6 hours and then excess monomer stripped and concentrated to higher solids if desired. The thus obtained aqueous solution of vinyl pyrrolidone polymer can then be directly copolymerized with styrene and butadiene to obtain the novel interpolymers of this invention. However, it is also possible, and often desirable, to interrupt the reaction after cooling the initial solution and storing this material for completing the interpolymerization at a later date. This solution can also be spray dried and the polymer stored as a powder until ready for use, at which time it can easily be redissolved in water.

These novel emulsions or latices of the interpolymer of vinyl pyrrolidone-styrene-butadiene are particularly useful as a tire cord dip, particularly for synthetic tire cords, e.g., rayon, polyester and nylon tire cords, used in the manufacture of automotive tires, and when so used, increases the adhesive of the tire cord to the natural or synthetic rubbers used. The novel latex of the present invention can be used in such tire cord dips as a replacement for the vinyl pyridine-styrene-butadiene latex emulsion, which is at present quite generally used in such dips. Typically, the emulsion or latex is added to a tire cord dip containing a resorcinol-formaldehyde polymer, along with other additives common in such dips. The cord is passed through the dip, dried and adhered to the rubber tire under heat and pressure, as the rubber is cured in the usual manner.

The novel terpolymers of the present invention produced as described in Examples II, III and IV above were evaluated as tire cord adhesives in comparison with a commercial vinyl pyridine/butadiene/styrene terpolymer latex as a "control." In each case, nylon tire cord was passed through a dip of a latex of 40 parts of the terpolymer under test and 60 parts of a resorcinol/formaldehyde resin, dried and cured in the usual manner under heat and pressure. The results obtained in the "U" adhesive test (reported as force in pounds necessary to pull a single cord out of a block of rubber in which it had been vulcanized) and in the Dynamic Strip Adhesion test and Heat Durability test compared with the "Control" rated as 100 are given in Table I below. In the Heat Durability test a specially built hose, with the reinforcing cords running parallel to the long dimension of the hose, is held under constant deformation of 90° and rotated under pressure until failure.

TABLE I

| Terpolymer Employed | "U" Adhesion Tested at 250° C. | | Dynamic Strip Adhesion | Heat Durability Test |
|---|---|---|---|---|
| | Low Cure | High Cure | | |
| Control | 26.4 | 23.7 | 100 | 100 |
| Example II | 28.4 | 24.0 | 100 | 111 |
| Example III | 26.8 | 22.2 | 106 | 125 |
| Example IV | 29.2 | 23.1 | 84 | 122 |

The novel terpolymers of the present invention, either dried or in the form of the latices in which they are obtained, are suitable for a wide variety of uses in the art. They are unusually stable to intense mechanical shear, freeze-thaw cycling, and the addition of electrolytes such as mineral acids and polyvalent metal salts. They are compatible with many other commercial latices and tolerate pigment and filler loading. They can be used in a wide variety of adhesive applications in addition to their use as tire cord dip, particularly for laminating similar or dissimilar materials together, such as for bonding synthetic plastics to fabrics of natural or synthetic origin such as the application of polyurethane to fabrics, and other adhesive sizing and coating applications, and particularly with paper, leather and textiles. These novel latices, either alone or compounded with other resins or latices, form films which set up rapidly and adhere well to a number of polar and non-polar surfaces. In wet bonding of porous surfaces, penetration is uniform so that film thickness on the surface can be readily controlled. Requirements for a wide variety of coatings and special purpose adhesives are readily met by compounding with plasticizers, borates, solvents, pigments and thickeners or other modifying resins or latices. Among types of surfaces on which they can be used, either as coatings or as adhesives between two similar or dissimilar surfaces are paper, glass, natural and synthetic fibers, wood, aluminum foil, steel and leather. In paper applications, these novel latices are useful as a pigment binder for Georgia clay, TiO$_2$ and CaCO$_3$. Where applied to porous materials they impart improved oil and grease resistance, light stability and improved dyeability and printing and have good adhesion to paper and a variety of natural and synthetic fabrics. The films from these novel latices have good affinity for vat, sulfur, acid, disperse and direct dyes and their application as a surface coating or sizing to a variety of fabrics, particularly synthetic fabrics and films, improves the dyeability thereof and imparts antistatic properties. The films produced from the novel latices of the present invention can be applied and cured by heating (preferably from 150° to 200° C.) in order to effect the cross linking. Various curing aids can be used in this case, such as free radical sources, e.g., ammonium persulfate or small amounts of dibasic acids such as 1% or less of succinic acid.

The novel latices of the present invention are also useful as opacifying agents for liquid detergent compositions in amounts as low as from 1 to 2 parts by weight of the latex per 100 parts of liquid detergent formulation.

The novel latices of the present invention have been found to be compatible with such commercial latices as those of butadiene-acylonitrile latices, polyvinyl acetate copolymers, styrene-butadiene emulsions, vinyl acetate vinyl stearate copolymers, styrene emulsions, alkyd and acrylate emulsions or latices, and with such naturally occurring products as dextrin or starch. In the latter application, the novel latices of the present invention may be used in starch or dextrin adhesive compositions such as those described in our copending application Ser. No. 199,589 filed June 4, 1962. They are also compatible with other latices obtained by polymerization of vinyl monomers such as styrene or acrylic esters with polyvinyl pyrrolidone such as those described in our copending application Ser. No. 69,571 filed Nov. 16, 1961 now Patent No. 3,244,657 and Ser. No. 69,572 filed Nov. 16, 1961 now Patent No. 3,244,658.

Other variations in and modifications of the described processes which will be obvious to those skilled in the art can be made in this invention without departing from the scope or spirit thereof.

We claim:

1. The process of producing interpolymers of an N-vinyl lactam with styrene and butadiene which comprises subjecting a mixture of styrene and butadiene in an aqueous solution of a water-soluble homopolymer of an N-vinyl lactam to polymerization conditions in the presence of a water soluble emulsifying agent and a water soluble hydroperoxide polymerization catalyst, the ratio of homopolymer of N-vinyl lactam to styrene and butadiene being in the range of 5:95 to 60:40 by weight and the ratio of styrene to butadiene being in the range of 5:95 to 50:50.

2. The process as defined in claim 1 wherein said homopolymer of an N-vinyl lactam is a homopolymer of N-vinyl-2-pyrrolidone.

3. The process as defined in claim 2 wherein said catalyst comprises p-methane hydroperoxide.

4. The process as defined in claim 2 wherein said emulsifying agent is a mixture of the mono- and diphosphoric acid esters of an ethoxylated alkylphenol.

5. A stable aqueous emulsion of a graft copolymer of styrene and butadiene on a homopolymer of an N-vinyl lactam substrate, and wherein the ratio of homopolymer of N-vinyl lactam to styrene and butadiene is in the range of 5:95 to 60:40 by weight and the ratio of styrene to butadiene is in the range of 5:95 to 50:50.

6. An emulsion as defined in claim 5 wherein said homopolymer of an N-vinyl lactam is a homopolymer of N-vinyl-2-pyrrolidone.

7. A graft copolymer of styrene and butadiene on a homopolymer of an N-vinyl lactam substrate, and wherein the ratio of homopolymer of N-vinyl lactam to styrene and butadiene is in the range of 5:95 to 60:40 by weight and the ratio of styrene to butadiene is in the range of 5:95 to 50:50.

8. A graft copolymer as defined in claim 7 wherein said homopolymer of an N-vinyl lactam is a homopolymer of N-vinyl-2-pyrrolidone.

References Cited

UNITED STATES PATENTS

| 2,824,055 | 2/1958 | Lampe et al. | 260—879 |
| 2,890,199 | 6/1959 | McNalty et al. | 260—879 |
| 2,922,768 | 1/1960 | Mino et al. | 260—17.4 |
| 3,004,057 | 10/1961 | Nunn | 260—461 |
| 3,244,657 | 4/1966 | Grosser et al. | 260—29.6 |
| 3,244,658 | 4/1966 | Grosser et al. | 260—29.6 |

FOREIGN PATENTS 819,049  8/1959  Great Britain.

SAMUEL H. BLECH, Primary Examiner.

MURRAY TILLMAN, Examiner.

J. ZIEGLER, J. T. GOOLKASIAN, Assistant Examiners.